(12) United States Patent
Cassarino

(10) Patent No.: US 9,222,208 B2
(45) Date of Patent: Dec. 29, 2015

(54) ELASTIC SILICONE RUBBER BELT

(75) Inventor: Giancarlo Cassarino, Venice (IT)

(73) Assignee: Albany International Corp., Albany, NY (US)

( * ) Notice: Subject to any disclaimer, the term of this patent is extended or adjusted under 35 U.S.C. 154(b) by 1044 days.

(21) Appl. No.: 11/320,989

(22) Filed: Dec. 29, 2005

(65) Prior Publication Data

US 2007/0155565 A1    Jul. 5, 2007

(51) Int. Cl.
| F16G 1/04 | (2006.01) |
| D06C 7/00 | (2006.01) |
| B29D 29/00 | (2006.01) |
| D06C 21/00 | (2006.01) |
| B29K 83/00 | (2006.01) |

(52) U.S. Cl.
CPC ........ *D06C 7/00* (2013.01); *B29D 29/00* (2013.01); *D06C 21/00* (2013.01); *B29K 2083/005* (2013.01)

(58) Field of Classification Search
CPC ........................................... F16G 1/04
USPC ............... 474/260, 262, 267, 237; 428/36.91
See application file for complete search history.

(56) References Cited

U.S. PATENT DOCUMENTS

| 2,021,975 | A |   | 11/1935 | Wrigley et al. |
| 3,469,001 | A | * | 9/1969 | Keefe, Jr. .................. 264/290.5 |
| 3,792,621 | A | * | 2/1974 | Smith .......................... 474/265 |
| 3,938,399 | A | * | 2/1976 | Delfiol et al. .................. 57/336 |
| 4,183,986 | A | * | 1/1980 | Blaetterlein .................. 428/160 |
| 4,498,891 | A |   | 2/1985 | Mashimo et al. |
| 4,504,258 | A | * | 3/1985 | Tanaka et al. ................ 474/263 |
| 4,674,622 | A | * | 6/1987 | Utsunomiya et al. ........ 198/500 |
| 4,987,030 | A |   | 1/1991 | Saito et al. |
| 5,066,344 | A | * | 11/1991 | Inami et al. .................. 156/138 |
| 5,171,389 | A | * | 12/1992 | Stigberg ........................ 156/165 |
| 5,233,733 | A |   | 8/1993 | Rich et al. |
| 5,242,743 | A |   | 9/1993 | Nakanishi et al. |
| 5,261,473 | A |   | 11/1993 | Penant |
| 5,360,379 | A | * | 11/1994 | Carelli et al. ................ 474/260 |
| 5,658,655 | A | * | 8/1997 | Stanhope ..................... 442/364 |
| 5,731,059 | A | * | 3/1998 | Smith et al. ................. 428/192 |
| 5,846,654 | A | * | 12/1998 | Modrak ....................... 428/366 |
| 6,228,448 | B1 | * | 5/2001 | Ndebi et al. ............... 428/36.91 |
| 6,284,102 | B1 | * | 9/2001 | Inoue et al. ................ 162/358.4 |
| 6,303,215 | B1 | * | 10/2001 | Sonobe et al. ............. 428/295.4 |
| 6,321,061 | B1 | * | 11/2001 | Sonobe et al. ................ 399/329 |
| 6,632,151 | B1 | * | 10/2003 | Knutson ....................... 474/266 |
| 6,863,761 | B2 |   | 3/2005 | Knutson |

(Continued)

FOREIGN PATENT DOCUMENTS

| EP | 1 489 216 A | 12/2004 |
| GB | 1030354 | 5/1966 |
| GB | 1088066 | 10/1967 |
| WO | WO 2004/072368 A | 8/2004 |

*Primary Examiner* — Robert A Siconolfi
*Assistant Examiner* — Mahbubur Rashid
(74) *Attorney, Agent, or Firm* — Frommer Lawrence & Haug LLP

(57) ABSTRACT

A rubber belt comprising at least one layer of a plurality of tightly packed elastic yarns or fibers and at least one layer of silicone rubber. A method of manufacturing a rubber belt is also disclosed. The method comprises the steps of wrapping one or more elastic yarns or fibers onto a mandrel, where the one or more elastic yarns or fibers form one or more layers on the mandrel; adding a liquid high viscosity silicone rubber on top of the one or more layers; and heating the mandrel in order to polymerize the silicone rubber.

16 Claims, 4 Drawing Sheets

(56) References Cited

U.S. PATENT DOCUMENTS

| | | | |
|---|---|---|---|
| 2003/0078125 A1* | 4/2003 | Knutson | 474/260 |
| 2005/0086833 A1* | 4/2005 | FitzPatrick | 34/611 |
| 2005/0245340 A1* | 11/2005 | Ballhausen et al. | 474/266 |
| 2006/0112526 A1* | 6/2006 | Bertoldo | 26/18.6 |

* cited by examiner

ELASTIC SILICONE RUBBER BELT

BACKGROUND OF THE INVENTION

1. Field of the Invention

The instant invention relates generally to the production of textiles. More specifically, the instant invention relates to a textile machine belt that is used in the textile finishing process.

2. Background of the Invention

Depending on the circumstances, circular knit fabrics may be required to undergo successive processing operations during the preparation, dyeing, finishing and making-up thereof both in tubular form, as they descend from the circular knitting machine, and in open form, obtained by cutting the tubular fabric along one of its side edges. Generally, before undergoing wet treatments such as, for example dyeing, depending on the type or types of fiber which form the fabric, the fabric is subjected to a heat setting operation. In particular, heat setting is performed on fabrics composed of or partly containing synthetic fibers, such as thermoplastic fibers. The aim of heat setting is to fix the dimensions and the flat state of the surfaces of the fabric thereby providing the fabric with stability. Heat setting a fabric also eliminates permanent creases or distortions that occur during the course of processing in bleaching and dyeing machines.

With the currently available heat setting machines, it is not possible to differentiate between the processing of fabrics with an orthogonal pattern, i.e. of the weft/warp type, and the processing of knitted fabrics in general. This results in an increase in the duration of the processing cycle due to cutting and opening of the tubular fabric for heat setting and, sometimes, re-stitching of the fabric in a tubular form for the bleaching/dyeing operation, followed by reopening for the finishing and making-up operation. Moreover, these machines are unable to perform the heat setting of circular knitted fabrics, which must be completely processed in tubular form either for technical reasons, cost-related reasons or because of market requirements.

Processing of fabrics in tubular form without heat setting results in considerable risks from the point of view of quality and is only performed in exceptional cases. In the past, various attempts have been made to develop specific machines for heat setting fabrics in tubular form. However, the results obtained have been somewhat unsatisfactory. The known machines are characterized essentially by the method of conveying and guiding the tubular fabric and by the system for transferring heat to the fabric.

In some machines, the tubular fabric is guided by means of a flat expansion device and is fed in a flattened form between the surface of a heated steel cylinder and an endless felt belt. The main drawbacks of these machines include the squashing of the side edges of the tubular fabric and a non-uniform heat exchange on its two surfaces. In other machines, the tubular fabric is guided by means of a flat expansion device which accompanies it in a flattened form through a horizontal or vertical chamber until it emerges therefrom. Inside the chamber, the two surfaces of the tubular fabric are acted on by flows of hot air. The heat exchange on the two surfaces of the fabric, however, is inadequate.

In a new textile manufacturing process, an elastic belt having a definite length is used. During the manufacturing process, in a section of the machine used to heat set the textile or cloth being produced, the definite length elastic belt elongates from 50 to 70% of its original length. Currently, rubber and nitrile rubber belts reinforced with yarns or fibers having a standard elasticity are used in the new manufacturing process. In addition, belts made only with rubber have also been used. These types of belts, however, have exhibited a short service life when used in the new textile manufacturing process. The service life of these prior belts are shortened even more when subjected to the elevated temperatures in the heat setting sections of the textile manufacturing machine. Therefore, the temperatures that can be used in the manufacturing process are limited. Furthermore, the prior rubber belts experience excessive shortening in width in the cross-machine (CD) direction when elongated in the machine (MD) direction, which creates problems in the manufacturing process.

Attempts have been made to solve the problems associated with prior belts by utilizing belts coated with an elastic material. These attempts, however, have been unsuccessful since delamination of the coating from the belt occurs.

Accordingly, a need exists for a rubber belt that does not substantially shrink in width in the CD direction while it elongates from 50 to 70% of its original length in the MD direction. Furthermore, a reinforced rubber belt is needed that has a low risk of delamination between the rubber portion and the reinforcing portion of the belt while elongating in the MD direction. The instant invention is directed to overcoming these shortcomings associated with prior art belts.

SUMMARY OF THE INVENTION

It is therefore a principal object of the invention to provide a rubber belt that is capable of being used in a new textile manufacturing process.

It is a further object of the invention to provide a rubber belt that is capable of being used at elevated temperatures such as those experienced in a heat setting section of a textile manufacturing machine.

Yet another object of the invention is to provide a rubber belt that is capable of elongating from 50 to 70% of its original length.

A further object of the invention is to provide a rubber belt that does not substantially shrink in the CD direction while it elongates in the MD direction.

A still further object of the invention is to provide a rubber belt that resists delamination when elongating.

Yet another objective of the invention is to provide a rubber belt that is capable of being used to produce a variety of textiles.

A still further objective of the instant invention is to provide a rubber belt that is more durable, resulting in an increased service life.

These and other objects and advantages are provided by the instant invention. In this regard, the instant invention is directed to a machine belt that is used to manufacture textiles. The instant belt is a rubber belt comprising at least one layer of tightly packed elastic yarns or fibers and a layer of silicone rubber. The elastic yarns or fibers are tightly packed in order to allow the belt to elongate in length in the MD direction while the belt's width in the CD direction remains substantially unchanged.

In addition, the instant invention is directed to a method of manufacturing a rubber belt. The method comprises wrapping one or more elastic yarns or fibers onto a mandrel or around two substantially parallel rolls, wherein the one or more elastic yarns or fibers form one or more layers on the mandrel or the substantially parallel rolls. Once the elastic yarns or fibers are wrapped onto the mandrel or around the substantially parallel rolls, a liquid high viscosity silicone rubber is added on top of the one or more yarns layers. After the silicone rubber is added, the mandrel or the two substantially parallel rolls and the added silicone rubber, are heated in order to polymerize the silicone rubber.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred embodiments of the invention are illustrated in the accompanying drawings in which corresponding components are identified by the same reference numerals.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENTS

Figure 1:
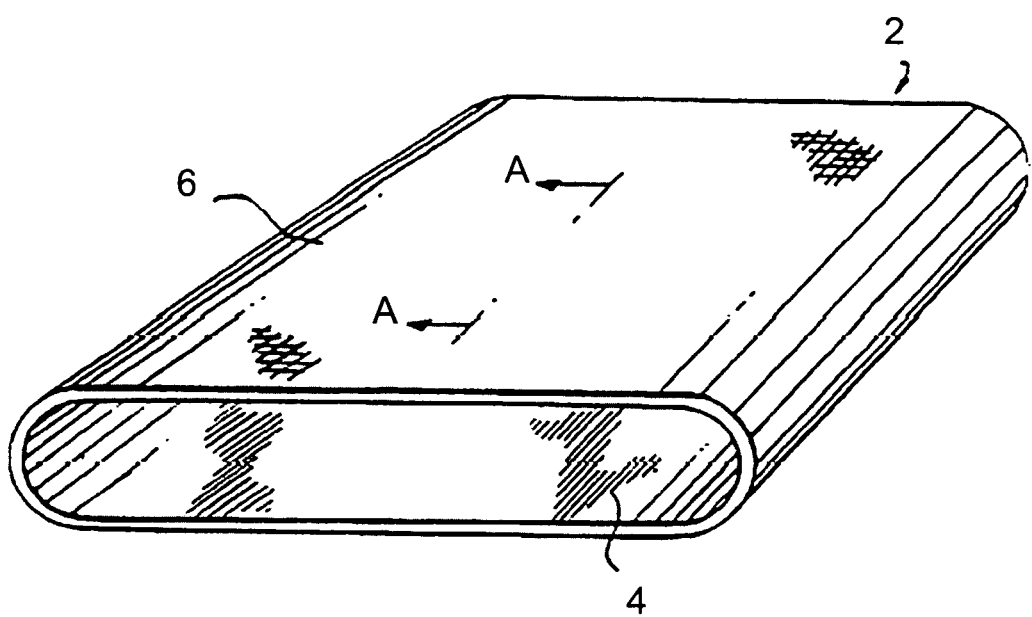
FIG. 1 is a perspective view of a belt of the instant invention.

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. In the following description, like reference characters designate like or corresponding parts throughout the figures.

The instant invention relates to a silicone rubber belt that is reinforced with a structure comprised of elastic yarns or fibers. As used herein, an elastic yarn or fiber is a yarn or fiber with an elongation at its breaking point of between 40 and 400% of its original length.

Currently, there exist rubber belts made with natural or synthetic rubbers, which are reinforced with yarns or fibers having a standard elasticity. Belts made only with natural, synthetic and silicone rubber also exist. The natural and synthetic rubber belts, however, have good elasticity but they also have low chemical and thermal resistances. On the contrary, belts made only of silicone rubber have very good thermal and chemical resistances but poor mechanical properties. Since a belt having good thermal and chemical resistances along with good mechanical properties is desired, a reinforced silicone rubber belt is needed and provided by the instant invention.

In an attempt to construct the desired reinforced rubber belt, a coating system was used. That is, an endless base fabric was constructed and coated with silicone rubber. In order to have good mechanical properties, the belt was constructed to have a double or triple layer base. This type of belt, however, created a structure having a high risk of delamination between the woven base and the silicone rubber coating, especially when the belt was stretched to a high elongation.

The instant invention solves the problems associated with prior coated belts by providing a rubber belt that is more elastic and more durable than prior belts. In a preferred embodiment, the instant invention is constructed by wrapping elastic yarns or fibers constructed from materials, such as but not limited to, natural rubber, LYCRA® and ELASTAN®, onto a cylinder or mandrel. The circumference of the mandrel should be close to the overall length of the elastic belt being constructed. At least one layer of elastic yarns or fibers are wrapped onto the mandrel. The number of layers of elastic yarns depend on the desired resistance of the belt to elongation. A single layer or a plurality of elastic yarn or fiber layers can be achieved by wrapping a single elastic yarn or fiber onto the mandrel in a continuous manner such that a single layer or a plurality of layers are formed with the elastic yarns or fibers in each layer tightly packed adjacent to one another. In addition, a plurality of elastic yarns or fibers can be wrapped onto the mandrel to form the one or more layers of tightly packed elastic yarns or fibers.

Once the elastic yarns or fibers are wrapped onto or applied to the mandrel, a high viscosity silicone rubber is added on top of the elastic yarn or fiber layers. Silicone rubber is added in order to attain the belt's required thickness and to provide a textile contacting surface. The textile contacting surface may be designed to impart a smooth or a textured finish to the textile being formed thereon.

The elastic yarns or fibers are specially treated with a tie coat or adhesion promoter in order to assure an excellent adhesion between the elastic yarns or fibers and the silicone rubber coating, thereby reducing the risk of belt delamination upon elongation. Adhesion between the yarns and the silicone rubber coating can also be increased by using twisted, multifilament yarns.

When the addition of the silicone rubber is completed, the mandrel is heated in order to polymerize the silicone rubber. A rubber belt constructed in this manner does not substantially shrink in width in the CD direction while it elongates in the MD direction and is capable of elongating from 50 to 70% of its original length in the MD direction. The completed belt may be used in textile finishing applications to finish, for example, textiles constructed of cotton, wool, synthetic fibers as well as blends of different fibers.

An alternative method for constructing the instant belt is similar to the preferred method in all aspects except that instead of constructing the belt on a mandrel, the instant belt is constructed using two substantially parallel rolls that are spaced apart from one another. The distance between the two substantially parallel rolls corresponds to the overall length of the completed belt. With this method, the elastic yarns or fibers are wrapped around the two substantially parallel rolls. Once the elastic yarns are wrapped onto the rolls, construction of the belt proceeds as detailed above for the mandrel.

A perspective view of an elastic silicone rubber belt of the instant invention is provided in FIG. 1. The belt 2 has an inner or bottom surface 4 and an outer or upper surface 6. The outer surface 6 is the textile contacting surface. The inner surface 4 of the belt 2 is in contact with the steel cylinders of the textile manufacturing machine.

Figure 2:
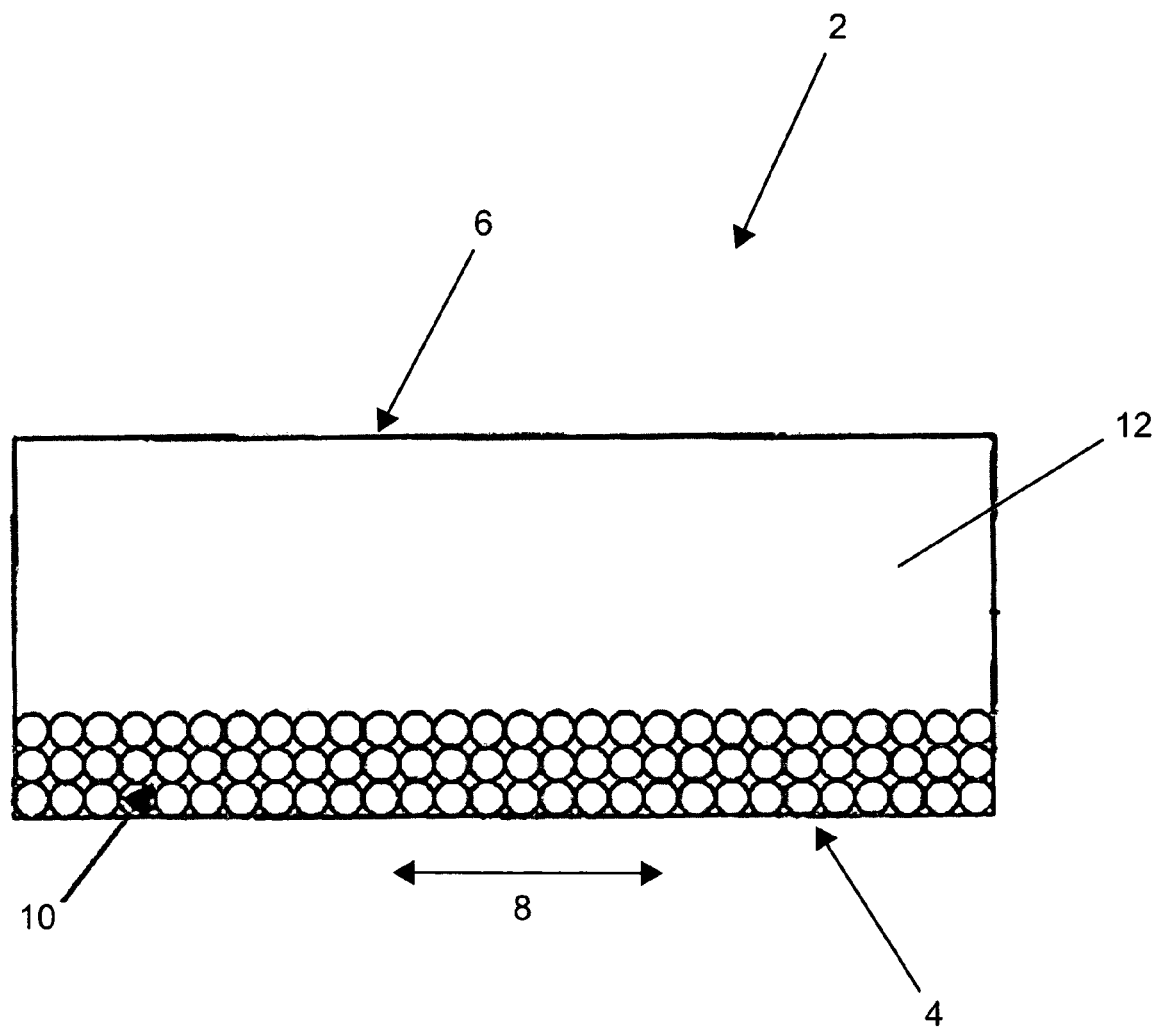
FIG. 2 is a cross-sectional view of a belt taken as indicated by line A-A in FIG. 1, according to one embodiment of the instant invention.

Depicted in FIG. 2 is a cross section through the thickness of a belt 2 constructed in accordance with one embodiment of the instant invention, as indicated by line A-A in FIG. 1. The CD direction of the belt is indicated by arrow 8. Adjacent to the bottom surface 4 of the belt 2 are one or more layers of elastic yarns or fibers 10. As can be seen in FIG. 2, the elastic yarns or fibers 10 are packed very tightly. This tight packing of the elastic yarns or fibers ensures that the belt 2 will not substantially shrink in width in the CD direction when it elongates in the MD direction while in use on a textile manufacturing machine. On top of the elastic yarns or fibers 10, adjacent to the outer surface 6 of the belt 2, is a silicone rubber layer 12.

Figure 3:
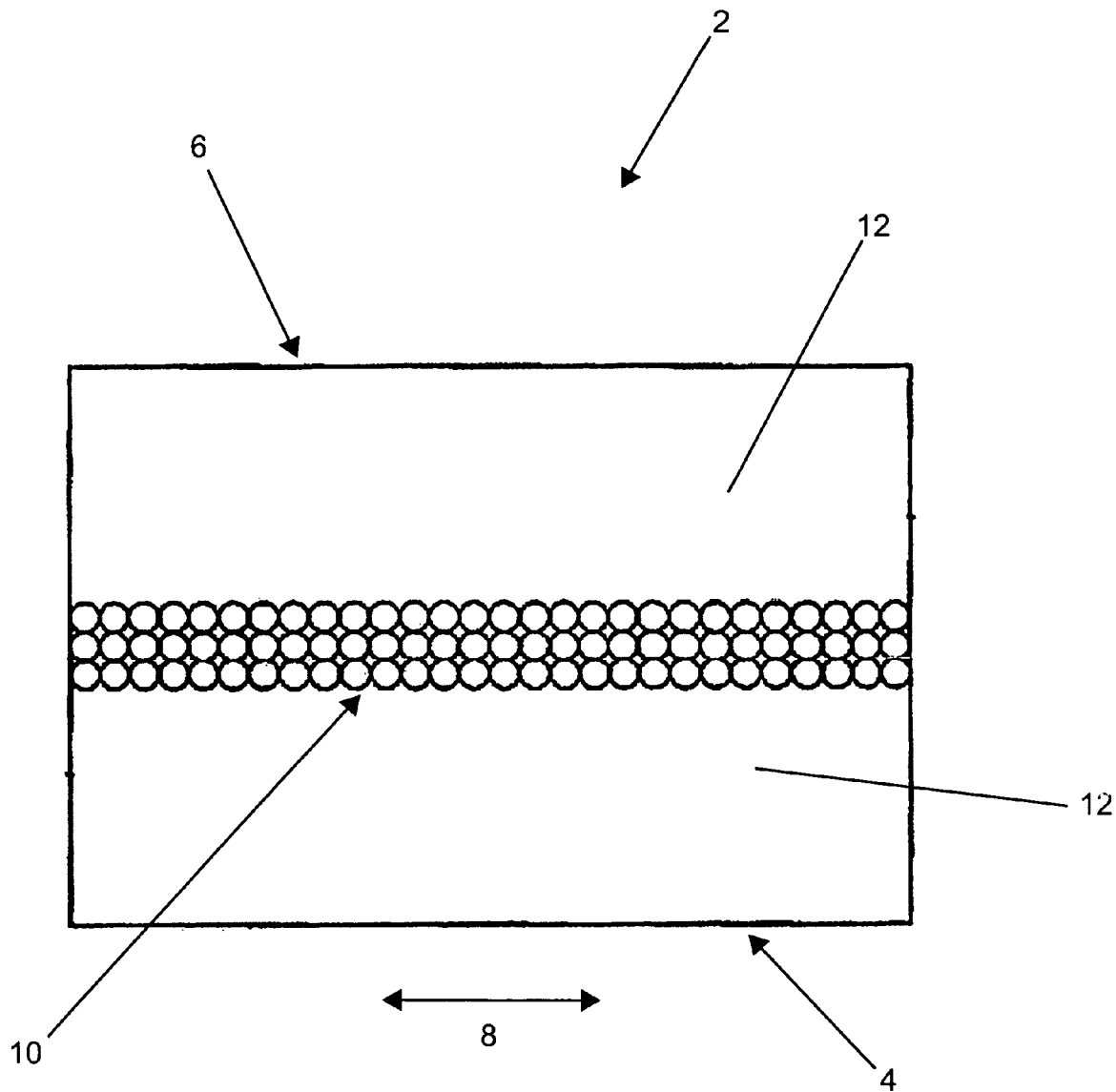
FIG. 3 is a cross-sectional view of a belt taken as indicated by line A-A in FIG. 1, according to another embodiment of the instant invention.
Figure 4:
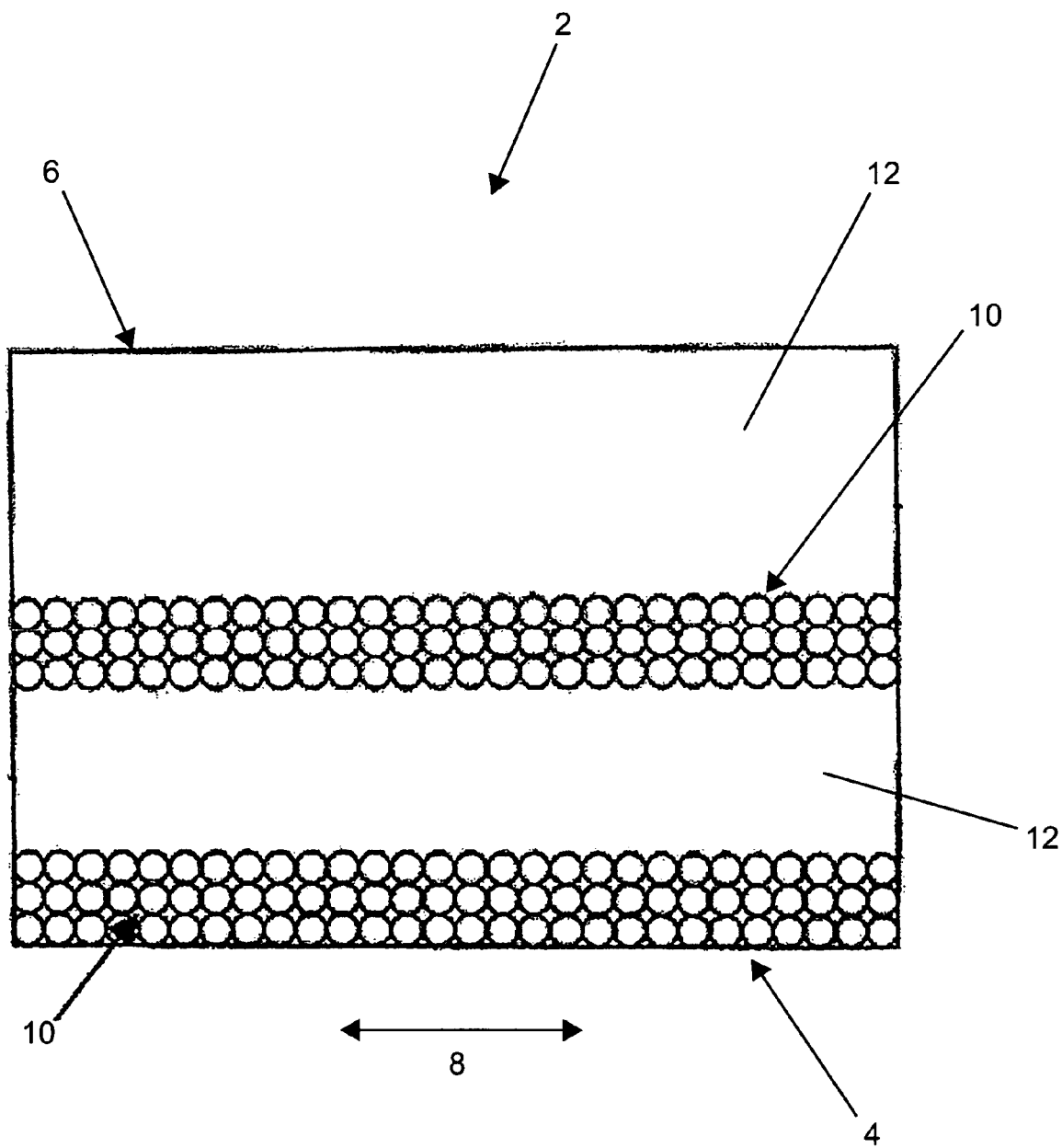
FIG. 4 is a cross-sectional view of a belt taken as indicated by line A-A in FIG. 1, according to a further embodiment of the instant invention.

FIGS. 3 and 4 depict cross-sections through the thickness of a belt 2, as indicated by line A-A in FIG. 1 constructed according to additional embodiments of the instant invention. As shown in FIG. 3, one or more layers of elastic yarns or fibers 10 are sandwiched between silicone rubber layers 12. FIG. 4 depicts a belt having a plurality of elastic yarn or fiber layers 10 that alternate with a plurality of silicone rubber layers 12. In this configuration, an elastic fiber or yarn layer 10 is adjacent to the bottom surface 4 of the belt 2 and a silicone rubber layer 12 is adjacent to the outer surface 6 of the belt 2. As will be apparent to a skilled artisan, a rubber belt constructed in accordance with the instant invention, may have numerous configurations for the elastic yarn or fiber layers 10 and the silicone rubber layers 12.

Although a preferred embodiment of the present invention and modifications thereof have been described in detail herein, it is to be understood that this invention is not limited to this precise embodiment and modifications, and that other modifications and variations may be effected by one skilled in the art without departing from the spirit and scope of the invention as defined by the appended claims. The use of the instant belt in accordance with the invention is not limited to machines for rendering textiles shrinkproof, in other words, the instant belt can be used anywhere where the requirements mentioned above are placed on the quality and serviceable life of the belt.

What is claimed is:

1. A rubber belt comprising:
    a single layer formed substantially by a plurality of tightly packed elastic yarns or fibers provided by wrapping a single elastic yarn or fiber around a mandrel or two parallel rolls, the fiber extending in a machine direction (MD),
    wherein said elastic yarns or fibers have an elongation at breaking point between 40 and 400% of their original length, and further
    wherein each of the plurality of tightly packed elastic yarns or fibers are in contact with at least one adjacent elastic yarn or fiber associated with the plurality of tightly packed elastic yarns or fibers within the formed layer; and
    at least one layer of silicone rubber,
    wherein a width of said elongated rubber belt remains substantially unchanged in a cross machine direction (CD) when said belt is elongated in said machine direction from 50 to 70% of the belt's original length, and
    wherein a first side of one of the at least one layer of silicone rubber is in contact with a textile being formed thereon, and a second side of one of the at least one layer of silicone rubber, which is a side opposite to the first side of one of the at least one layer of silicone rubber, is in contact with the plurality of tightly packed elastic yarns or fibers extending in the machine direction (MD).

2. The rubber belt as claimed in claim 1, wherein said at least one layer of tightly packed elastic yarns or fibers is constructed using a single elastic yarn or fiber that is wrapped onto a mandrel in a continuous manner.

3. The rubber belt as claimed in claim 1, wherein said at least one layer of tightly packed elastic yarns or fibers is constructed using a plurality of elastic yarns or fibers.

4. The rubber belt as claimed in claim 1, wherein said elastic yarns or fibers are treated with a tie coat or adhesion promoter.

5. The rubber belt as claimed in claim 1, wherein said elastic yarns or fibers are twisted monofilament yarns or fibers.

6. The rubber belt as claimed in claim 1, wherein said elastic yarns or fibers are formed of an elastic material.

7. The rubber belt as claimed in claim 6, wherein said elastic material is selected from the group consisting of natural rubber, nitrile rubber, silicone rubber, and synthetic elastic fibers.

8. The rubber belt as claimed in claim 1, wherein said at least one layer of tightly packed elastic yarns or fibers is adjacent to a bottom surface of the belt.

9. The rubber belt as claimed in claim 1, wherein said at least one layer of tightly packed elastic yarns or fibers is sandwiched between silicone rubber layers.

10. A method of manufacturing a rubber belt comprising the steps of:
    wrapping one or more tightly packed elastic yarns or fibers provided by wrapping a single elastic yarn or fiber onto a mandrel in a machine direction (MD), wherein said elastic yarns or fibers have an elongation at a breaking point between 40 and 400% of their original length, and further wherein each of the plurality of tightly packed elastic yarns or fibers are in contact with at least one adjacent elastic yarn or fiber associated with the plurality of tightly packed elastic yarns or fibers, and wherein said one or more tightly packed elastic yarns or fibers form a single layer on said mandrel;
    adding a liquid high viscosity silicone rubber on top of said single layer; and
    heating said mandrel in order to polymerize said silicone rubber,
    wherein a width of said elongated rubber belt remains substantially unchanged in a cross machine direction (CD) when said belt is elongated in said machine direction from 50 to 70% of the belt's original length, and
    wherein a first side of the silicone rubber is in contact with a textile being formed thereon, and a second side of the silicone rubber, which is a side opposite to the first side of the silicone rubber, is in contact with the plurality of tightly packed elastic yarns or fibers extending in the machine direction (MD).

11. The method as claimed in claim 10 further comprising the step of treating said elastic yarns or fibers with a tie coat or adhesion promoter.

12. The method as claimed in claim 10, wherein said elastic yarns or fibers are twisted monofilament yarns or fibers.

13. The method as claimed in claim 10, wherein said elastic yarns or fibers are formed of an elastic material.

14. The method as claimed in claim 13, wherein said elastic material is selected from the group consisting of natural rubber, and synthetic elastic fibers.

15. A method of manufacturing a rubber belt comprising the steps of:
    wrapping one or more tightly packed elastic yarns or fibers provided by wrapping a single elastic yarn or fiber around two substantially parallel rolls spaced a distance apart from each other in a machine direction (MD), wherein said one or more tightly packed elastic yarns or fibers form a single layer on said two substantially parallel rolls, and wherein each of the plurality of tightly packed elastic yarns or fibers are in contact with at least one adjacent elastic yarn or fiber associated with the plurality of tightly packed elastic yarns or fibers;

adding a liquid high viscosity silicone rubber on top of said single layer; and heating said two substantially parallel rolls and said added liquid silicone rubber in order to polymerize said silicone rubber, and wherein a first side of the silicone rubber is in contact with a textile being formed thereon, and a second side of the silicone rubber, which is a side opposite to the first side of the silicone rubber, is in contact with the plurality of tightly packed elastic yarns or fibers extending in the machine direction (MD).

16. The method as claimed in claim 15, wherein said elastic yarns or fibers are formed of an elastic material.

\* \* \* \* \*